US012754805B1

(12) United States Patent
Kumar et al.

(10) Patent No.: US 12,754,805 B1
(45) Date of Patent: Oct. 6, 2026

(54) DYNAMICALLY ASSIGNING A STORAGE CLASS BASED ON AN ACCESS PATTERN ON THE SOURCE

(71) Applicant: Dell Products L.P., Round Rock, TX (US)

(72) Inventors: Shiv S. Kumar, Pune (IN); Kaushik Gupta, Pune (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 19/221,016

(22) Filed: May 28, 2025

(51) Int. Cl.
*G06F 16/00* (2019.01)
*G06F 11/1446* (2026.01)
*G06F 16/176* (2019.01)

(52) U.S. Cl.
CPC ...... *G06F 11/1458* (2013.01); *G06F 16/1774* (2019.01); *G06F 2201/80* (2013.01)

(58) Field of Classification Search
CPC ............. G06F 11/1458; G06F 16/1774; G06F 2201/80
See application file for complete search history.

(56) References Cited

U.S. PATENT DOCUMENTS

| | | | |
|---|---|---|---|
| 11,221,782 | B1 | 1/2022 | Idicula |
| 2016/0378616 | A1 | 12/2016 | Wigmore |
| 2019/0220527 | A1 | 7/2019 | Sarda |
| 2020/0019619 | A1 | 1/2020 | Sarda |
| 2022/0092022 | A1 | 3/2022 | Agarwal |
| 2022/0107974 | A1 | 4/2022 | Kumar |
| 2022/0261152 | A1 | 8/2022 | Jude |
| 2022/0391097 | A1 | 12/2022 | Rath |

FOREIGN PATENT DOCUMENTS

| | | | | |
|---|---|---|---|---|
| CA | 1321845 C | * 8/1993 | .......... | G06F 11/2094 |
| WO | WO-2011137743 A1 | * 11/2011 | ......... | G06F 21/6209 |

OTHER PUBLICATIONS

Fang et al.,“High Performance Database Logging using Storage Class Memory”,2011,IEEE,pp. 1-11 (Year: 2011).*
Kumar et al. “Dynamic Storage Class Selection for Files Backed up to the Cloud” U.S. Appl. No. 19/220,991, filed May 28, 2025, 43 pages.
Office Action mailed Jul. 8, 2026 for U.S. Appl. No. 19/220,991, 31 pages.

* cited by examiner

*Primary Examiner* — Alexander Khong
(74) *Attorney, Agent, or Firm* — Amin, Turocy & Watson, LLP

(57) ABSTRACT

A system can comprise a filter driver that is configured to generate respective work items for respective successful file operations on respective files of the system. The system can comprise a daemon that is configured to, for the respective work items, perform respective instances of updating a database with respective indications of the respective files while holding an exclusive lock. The system can comprise a job engine that is configured to rename the database, to produce a renamed instance of the database, create a new instance of the database, and for respective entries of the renamed instance of the database, determine respective storage classes for respective objects of an object storage system that correspond to the respective files, and update the object storage system with the respective storage classes for the respective objects.

20 Claims, 10 Drawing Sheets

DYNAMICALLY ASSIGNING A STORAGE CLASS BASED ON AN ACCESS PATTERN ON THE SOURCE

BACKGROUND

An object storage system can store computer data as objects in a flat storage space, where an object can be identified by a bucket and an identifier of the object within the bucket. Object storage can be viewed in contrast to file storage, where data is stored as files in a hierarchical ordering of directories. Data on object storage systems and file storage systems can be backed up.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can comprise at least one processor. The system can comprise a filter driver that is configured to generate respective work items for respective successful file operations on respective files of the system. The system can comprise a daemon that is configured to, for the respective work items, perform respective instances of acquiring an exclusive lock on a database, perform respective instances of updating the database with respective indications of the respective files while holding the exclusive lock, and perform respective instances of releasing the exclusive lock on the database after performing the respective instances of the updating. The system can comprise a job engine that is configured to acquire the exclusive lock on the database, rename the database, to produce a renamed instance of the database, create a new instance of the database, wherein the creating of the new instance of the database comprises maintaining the exclusive lock on the database with respect to the new instance of the database, release the exclusive lock on the new instance of the database, and for respective entries of the renamed instance of the database, determine respective storage classes for respective objects of an object storage system that correspond to the respective files, and update the object storage system with the respective storage classes for the respective objects.

An example method can comprise generating, by a filter driver of a system comprising at least one processor, respective work items for respective successful file operations on respective files of the system. The method can further comprise performing, by a daemon of the system, respective instances of acquiring an exclusive lock on a database. The method can further comprise performing, by the daemon, respective instances of updating the database with respective indications of the respective files while holding the exclusive lock. The method can further comprise performing, by the daemon, respective instances of releasing the exclusive lock on the database after performing the respective instances of the updating. The method can further comprise acquiring, by a job engine of the system, the exclusive lock on the database. The method can further comprise renaming, by the job engine, the database, to produce a renamed instance of the database. The method can further comprise creating, by the job engine, a new instance of the database, wherein the creating of the new instance of the database comprises maintaining the exclusive lock on the database with respect to the new instance of the database. The method can further comprise releasing, by the job engine, the exclusive lock on the new instance of the database. The method can further comprise, for respective entries of the renamed instance of the database, determining, by the job engine, respective storage classes for respective objects of an object storage system that correspond to the respective files, and update the object storage system with the respective storage classes for the respective objects.

An example non-transitory computer-readable medium can comprise instructions that, in response to execution, cause a system comprising a processor to perform operations. These operations can comprise generating, by a filter driver of the system, respective work items for respective successful file operations on respective files of the system. These operations can further comprise performing, by a daemon of the system, respective instances of updating a database with respective indications of the respective files while holding an exclusive lock on the database. These operations can further comprise renaming, by a job engine of the system, the database, to produce a renamed instance of the database. These operations can further comprise creating, by the job engine, a new instance of the database. These operations can further comprise, for respective entries of the renamed instance of the database, determining, by the job engine, respective storage classes for respective objects of an object storage system that correspond to the respective files, and update the object storage system with the respective storage classes for the respective objects.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which.

DETAILED DESCRIPTION

Overview

Figure 1:
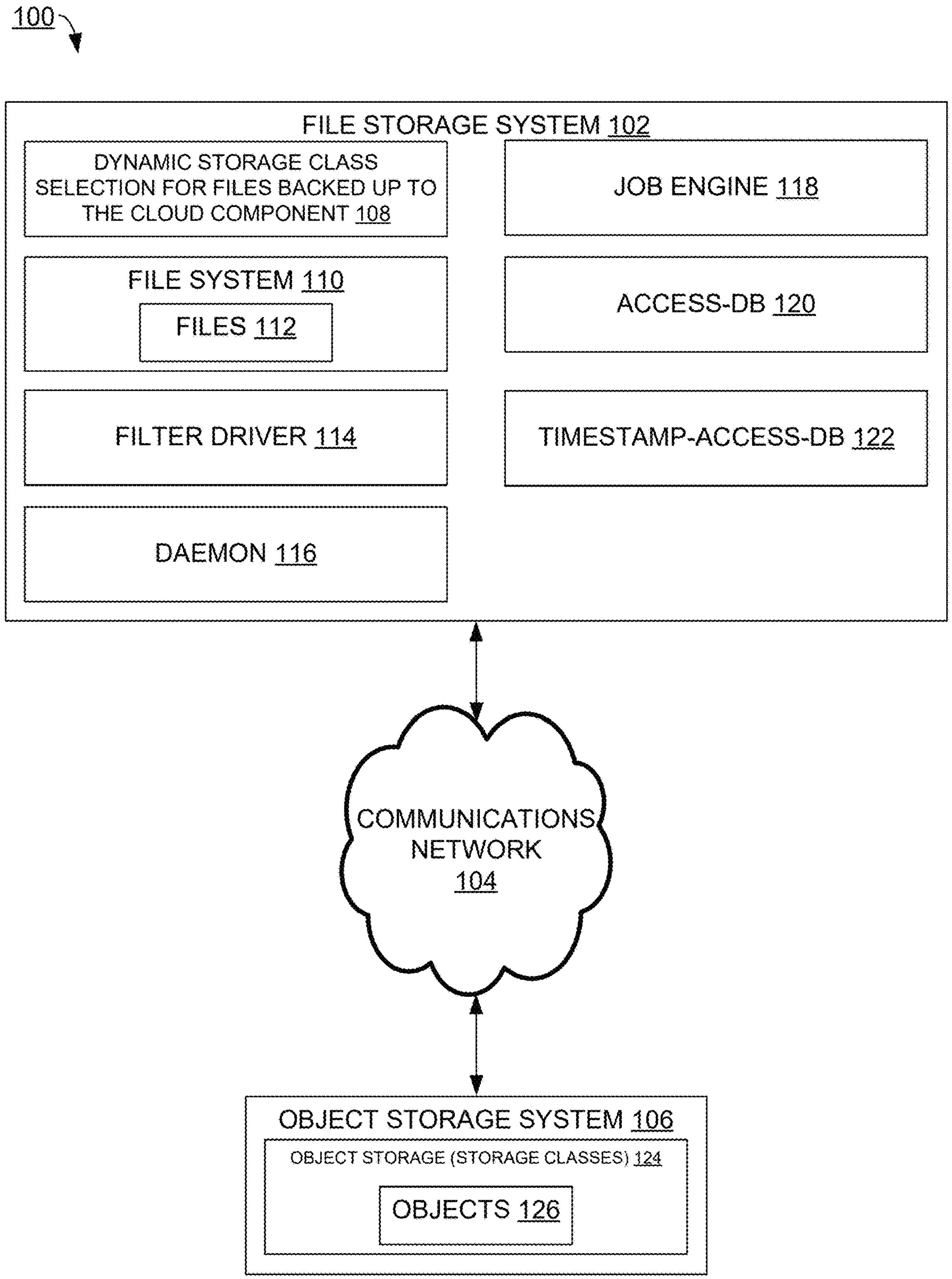
FIG. 1 illustrates an example system architecture that can facilitate dynamically assigning a storage class based on an access pattern on the source, in accordance with an embodiment of this disclosure.

While backing files from file storage to cloud object storage, it can be that the cloud object storage know is informed of which storage class these objects should be stored in. There can be multiple storage classes available based on usage of objects (e.g., cheaper, larger, and less performant v. more expensive, smaller, and more performant). Different costs can be associated with different storage classes. It can be that prior approaches to file-to-object backup solutions are unaware of how frequently these stored objects will be used in future. Given that, prior approaches can generally use a standard storage class (that is, neither the highest performant storage nor the lowest performant storage) for backed up storage.

The present techniques can be applied to the following example scenarios:

1. If a file is accessed frequently on file-storage, there can be a desire for corresponding backed up objects (on cloud) to be restored faster than others;
2. If a file is accessed less frequently, it can be acceptable for there to be some degree of delay in restoring from cloud objects; and
3. If objects of a file are stored on a performant storage class, they can be restored more quickly than those objects that are stored on less performant storage.

The present techniques can be implemented to dynamically decide the storage class for an object at the client side.

It can be that prior approaches to backup solutions do not have the ability to dynamically decide the storage class where the objects should land in the cloud. Rather, they can use the standard storage class. At most, it can be that prior approaches choose the storage class that monitors access-time and automatically changes the storage class of an object based on the access-time of the object.

It can be that a cloud provider can charge for monitoring and automatically change storage class (e.g., at a charge of $0.0025 per one thousand objects). This charge can be in addition to the cost of the storage class where the object resides.

Since it can be that the client is where the data and archive-policies reside, the client can be the better place to identify the appropriate storage class for a backed up object.

The present techniques can be implemented to facilitate moving objects from a standard storage class to an archive storage class. However, it can be that prior approaches do not provide a way to dynamically update storage class based on the access policy at the client when the client does not have an archive policy.

In some examples, the present techniques can be implemented as follows, where they are broken into three parts for illustrative purposes:

A. Changes in a filter driver of the client. For every file operation, if the operation was successful, a work-item can be queued before sending the response to the client.

B. Handling the work-item. A daemon can pick work items.

For each work-item, check if the file path is part of a synchronization policy that backs up to the cloud. If no, pick the next work item.

If yes, acquire exclusive ownership of the file path (e.g., a file system lock); update the access database ("access-DB"); and release exclusive ownership.

C. Updating the storage class dynamically. The job engine can run the job as per schedule. The job can:

acquire exclusive ownership;
rename the existing access-DB as timestamp-access-DB;
create a new access database;
release exclusive ownership;
fetch entries from timestamp-access-DB; and
determine the storage class and update the same on the cloud.

Example Architectures, Etc.

FIG. 1 illustrates an example system architecture 100 that can facilitate dynamically assigning a storage class based on an access pattern on the source, in accordance with an embodiment of this disclosure.

System architecture 100 comprises file storage system 102, communications network 104, object storage system 106, dynamically assigning a storage class based on an access pattern on the source component 108, file system 110, files 112, filter driver 114, daemon 116, job engine 118, access-DB 120, timestamp-access-DB 122, object storage (storage classes) 124, and objects 126.

Figure 10:
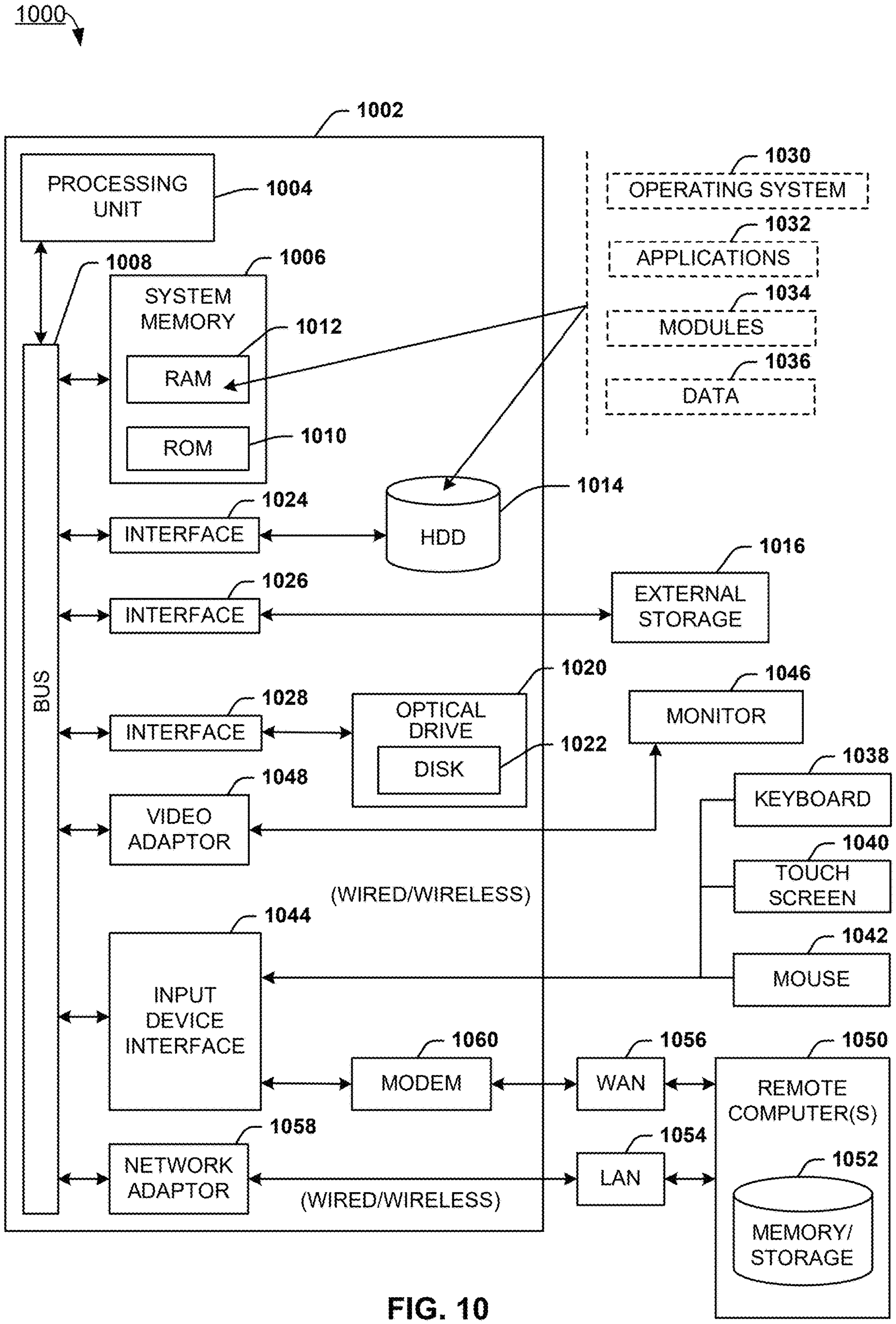
FIG. 10 illustrates an example block diagram of a computer operable to execute an embodiment of this disclosure.

Each of file storage system 102 and/or object storage system 106 can be implemented with part(s) of computing environment 1000 of FIG. 10. Communications network 104 can comprise a computer communications network, such as the Internet.

Files 112 of file system 110 can be backed up as objects 126 on object storage (storage classes) 124 (where different storage classes can be associated with different performance levels).

Filter driver 114 can monitor file operations on file system 110. Filter driver 114 can generate work items for successful file operations, e.g., as pairs comprising a file that was operated on (e.g., as a hash of the file) and a timestamp at which the operation occurred.

Daemon 116 can access these work items and add the information to access-DB 120. Where the work item comprises an indication of the file (e.g., a file path) that is different than a hash of the file, and where a hash of the file is sued in access-DB 120, then daemon 116 can create the hash. In doing so, daemon 116 can acquire an exclusive lock on access-DB 120 (such as one where no other entity can read from or write to access-DB without possessing the lock), then release the lock after updating access-DB 120.

Periodically, job engine 118 can run, to rename access-DB 120 as timestamp-access-DB 122, create a new (empty) version of access-DB, and then adjust storage classes for objects 126 based on the information in timestamp-access-DB 122 (e.g., where a file has been accessed frequently, the storage class for its corresponding object can be changed to a higher-performant storage class, such as one associated with a lower latency for access).

Job engine 118 can acquire an exclusive lock on access-DB 120 while performing operations on access-DB 120.

Figure 3:
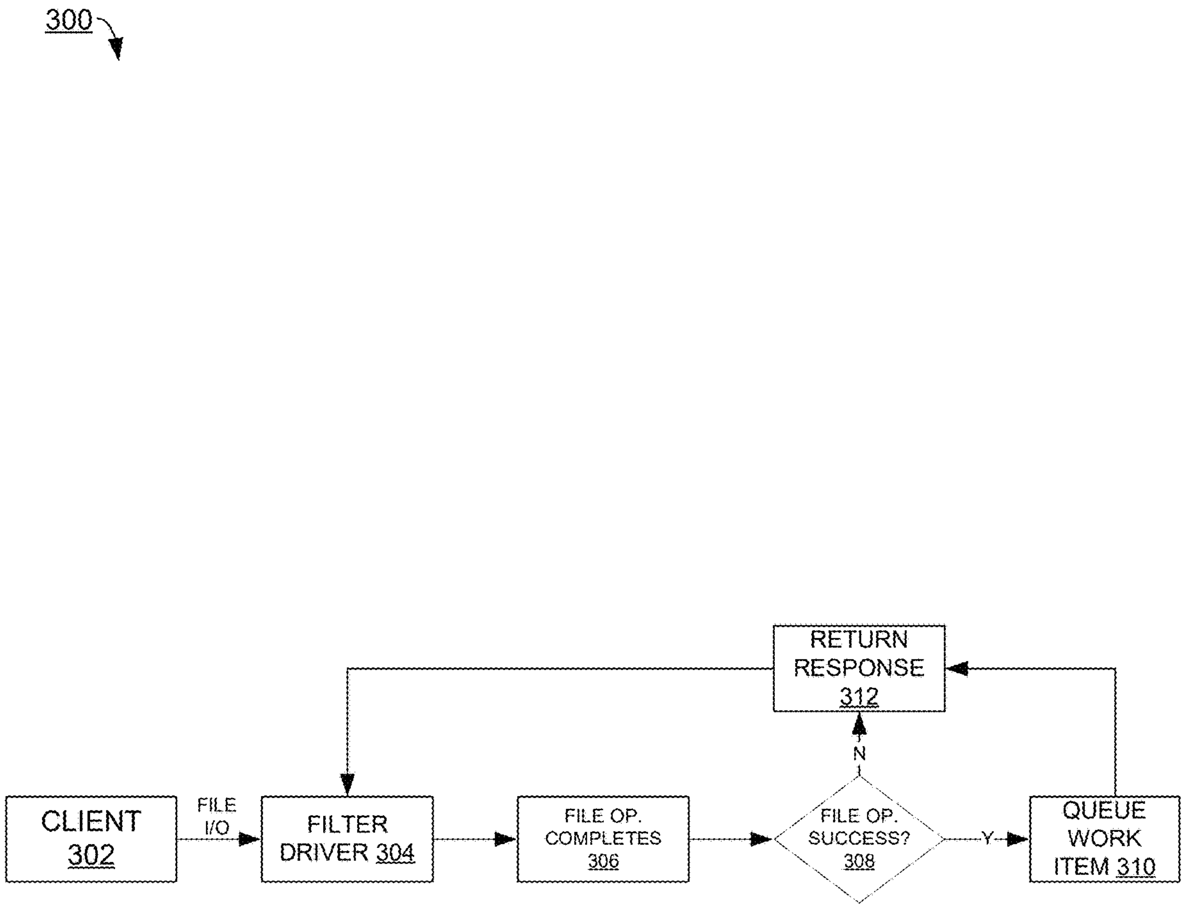
FIG. 3 illustrates an example that can facilitate dynamically assigning a storage class based on an access pattern on the source, in accordance with an embodiment of this disclosure.

In some examples, dynamically assigning a storage class based on an access pattern on the source component 108 can implement part(s) of the process flows of FIGS. 3 and/or 5-9 to implement dynamically assigning a storage class based on an access pattern on the source.

It can be appreciated that system architecture 100 is one example system architecture for dynamically assigning a storage class based on an access pattern on the source, and that there can be other system architectures that facilitate dynamically assigning a storage class based on an access pattern on the source.

Figure 2:
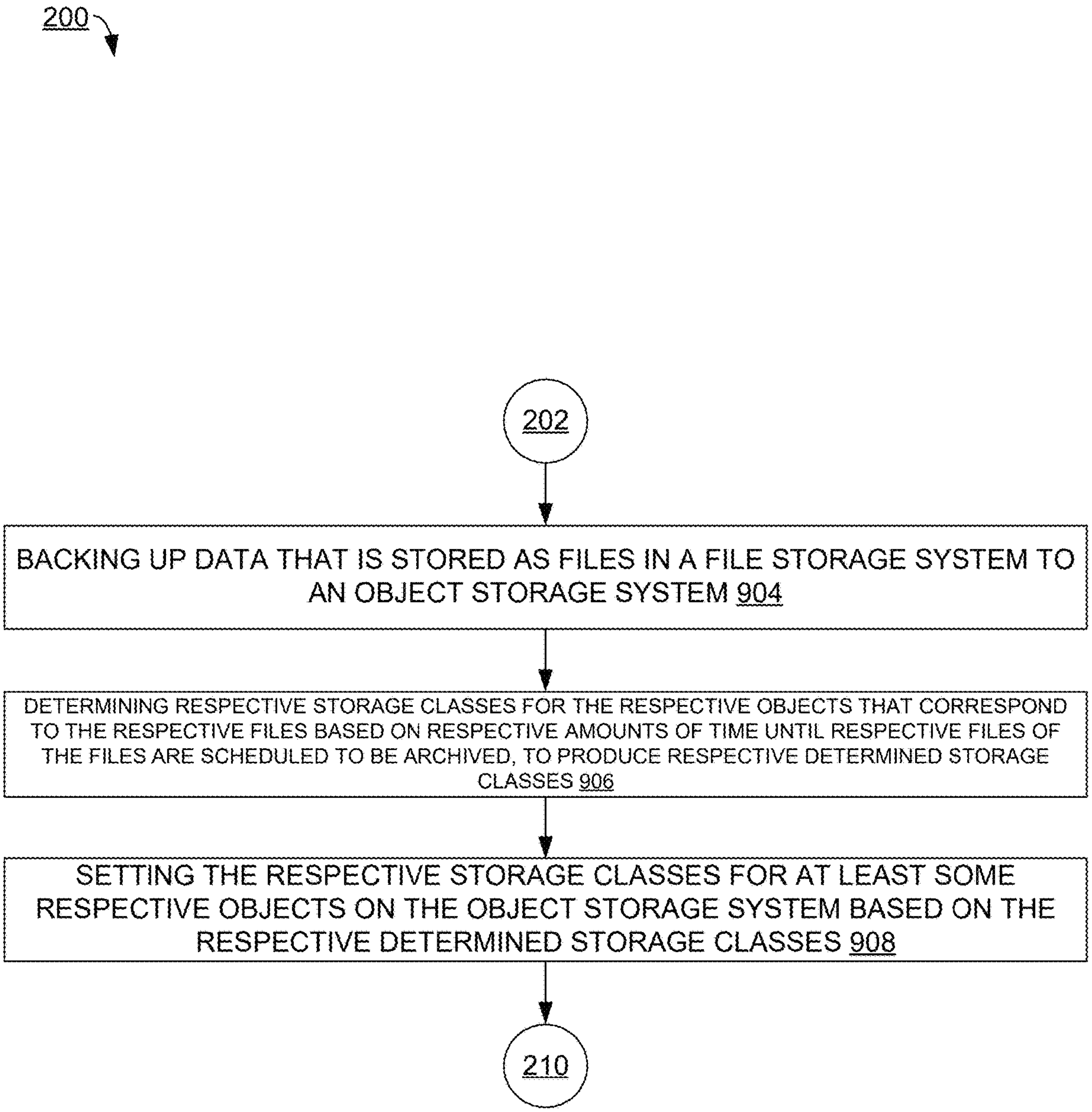
FIG. 2 illustrates an example process flow that can facilitate dynamically assigning a storage class based on an access pattern on the source, in accordance with an embodiment of this disclosure.

FIG. 2 illustrates an example process flow 200 that can facilitate dynamically assigning a storage class based on an access pattern on the source, in accordance with an embodiment of this disclosure. In some examples, one or more embodiments of process flow 200 can be implemented by dynamically assigning a storage class based on an access pattern on the source component 108 of FIG. 1, or computing environment 1000 of FIG. 10.

It can be appreciated that the operating procedures of process flow 200 are example operating procedures, and that there can be embodiments that implement more or fewer operating procedures than are depicted, or that implement the depicted operating procedures in a different order than as depicted. In some examples, process flow 200 can be implemented in conjunction with one or more embodiments of one or more of process flow 800 of FIG. 8, and/or process flow 900 of FIG. 9.

Process flow 200 begins with 202, and moves to operation 204.

Operation 204 depicts monitoring file system operations. That is, for each file operation, if the operation was successful, a work-item can be queued before sending a response to the client.

After operation 204, process flow 200 moves to operation 206.

Operation 206 depicts handling work items. That is, a daemon can pick work items. For each work-item, if the file path is part of a policy that backs up to the cloud, then update an access-DB to include this file, while having exclusive ownership of access-DB. After operation 206, process flow 200 moves to operation 208.

Operation 208 depicts updating the storage class dynamically. That is, a job engine can rename access-DB as timestamp-access_DB, create a new access-DB, fetch, entries from Timestamp-access_DB, and use the entries to determine storage class updates for objects, and update the storage classes. The job engine can have exclusive ownership of access-DB while accessing access-DB.

After operation 208, process flow 200 moves to 210, where process flow 200 ends.

FIG. 3 illustrates an example 300 that can facilitate dynamically assigning a storage class based on an access pattern on the source, in accordance with an embodiment of this disclosure. In some examples, part(s) of example 300 can be used by part(s) of system architecture 100 of FIG. 1 to facilitate dynamically assigning a storage class based on an access pattern on the source.

Example 300 comprises client 302, filter driver 304, file operation completes 306, file operation (FOP) successful? 308, queue work item 310, and return response 312.

Figure 4:
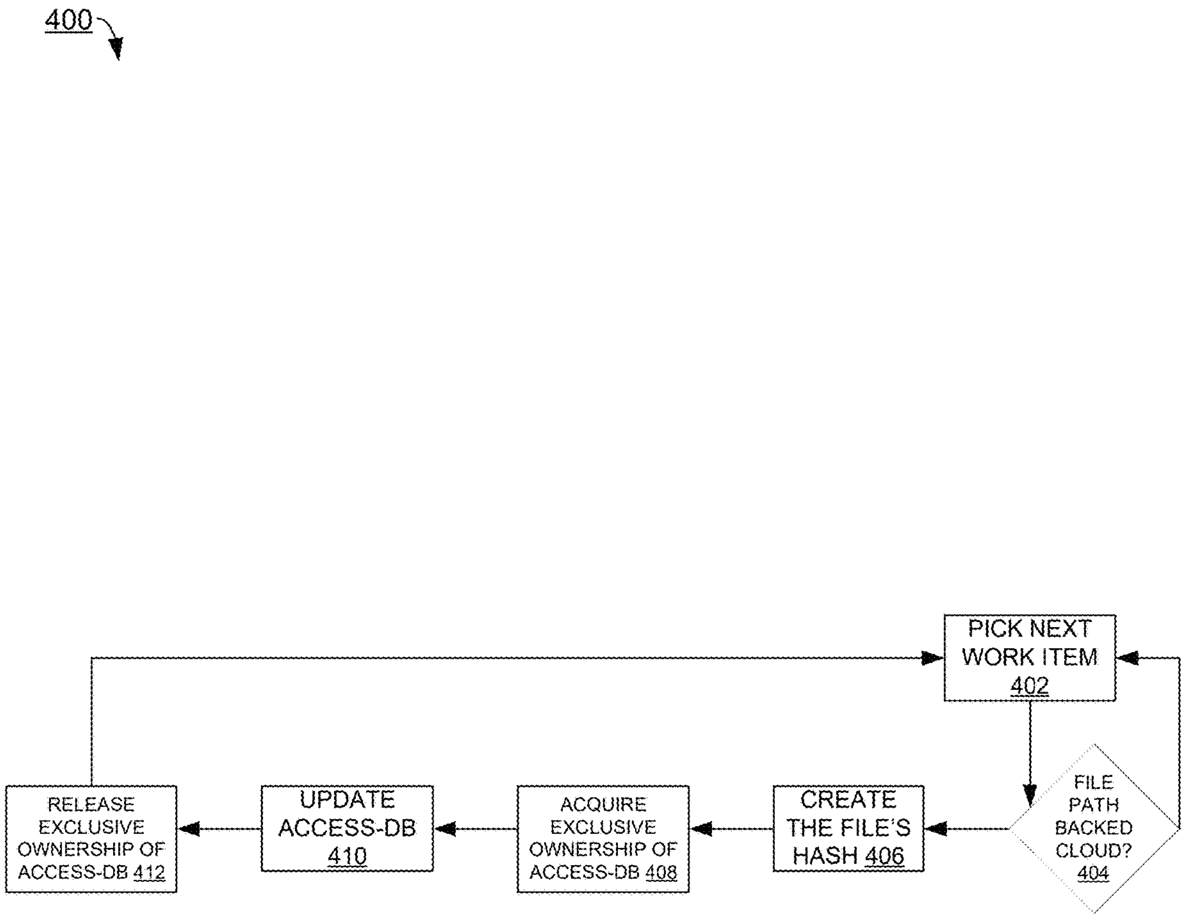
FIG. 4 illustrates another example that can facilitate dynamically assigning a storage class based on an access pattern on the source, in accordance with an embodiment of this disclosure.

Work items queued in queue work item 310 can be picked by pick next work item 402 of FIG. 4.

FIG. 4 illustrates another example 400 that can facilitate dynamically assigning a storage class based on an access pattern on the source, in accordance with an embodiment of this disclosure. In some examples, part(s) of example 400 can be used by part(s) of system architecture 100 of FIG. 1 to facilitate dynamically assigning a storage class based on an access pattern on the source.

Example 400 comprises pick next work item 402, file path being backed up to cloud? 404, create the file's hash 406, acquire exclusive ownership of access-DB 408, update access-DB 410, and release exclusive ownership of access-DB 412.

Pick next work item 402 can pick work items that are queued by queue work item 310 of FIG. 3.

Figure 5:
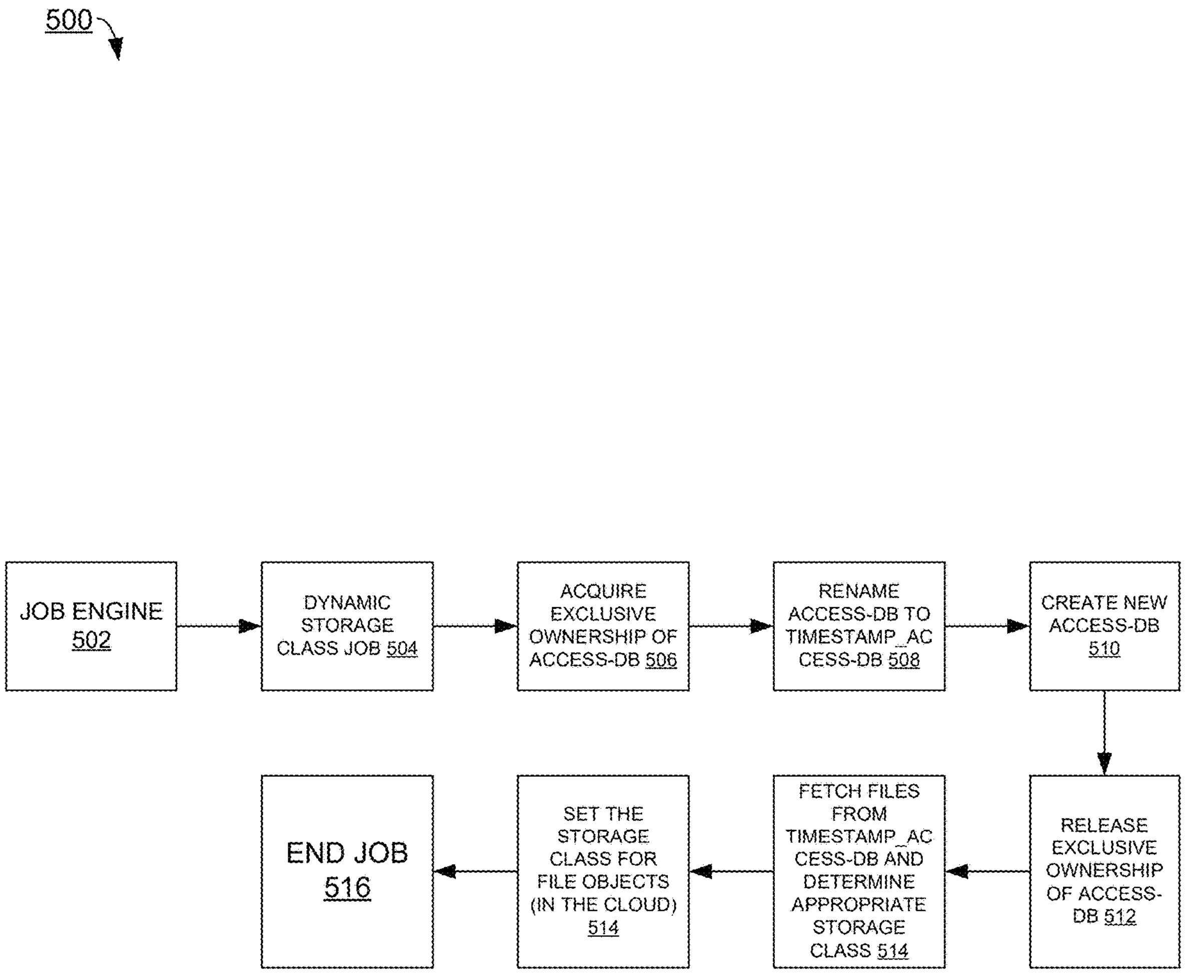
FIG. 5 illustrates another example that can facilitate dynamically assigning a storage class based on an access pattern on the source, in accordance with an embodiment of this disclosure.

FIG. 5 illustrates another example 500 that can facilitate dynamically assigning a storage class based on an access pattern on the source, in accordance with an embodiment of this disclosure. In some examples, part(s) of example 500 can be used by part(s) of system architecture 100 of FIG. 1 to facilitate dynamically assigning a storage class based on an access pattern on the source.

Example 500 comprises job engine 502, dynamic storage class job 504, acquire exclusive ownership of access-DB 506, rename access-DB to timestamp-access-DB 508, create new access-DB 510, release exclusive ownership of access-DB 512, fetch files from timestamp-access-DB and determine appropriate storage class 514, set the storage class for file objects (in the cloud) 514, and end job 516.

Figure 6:
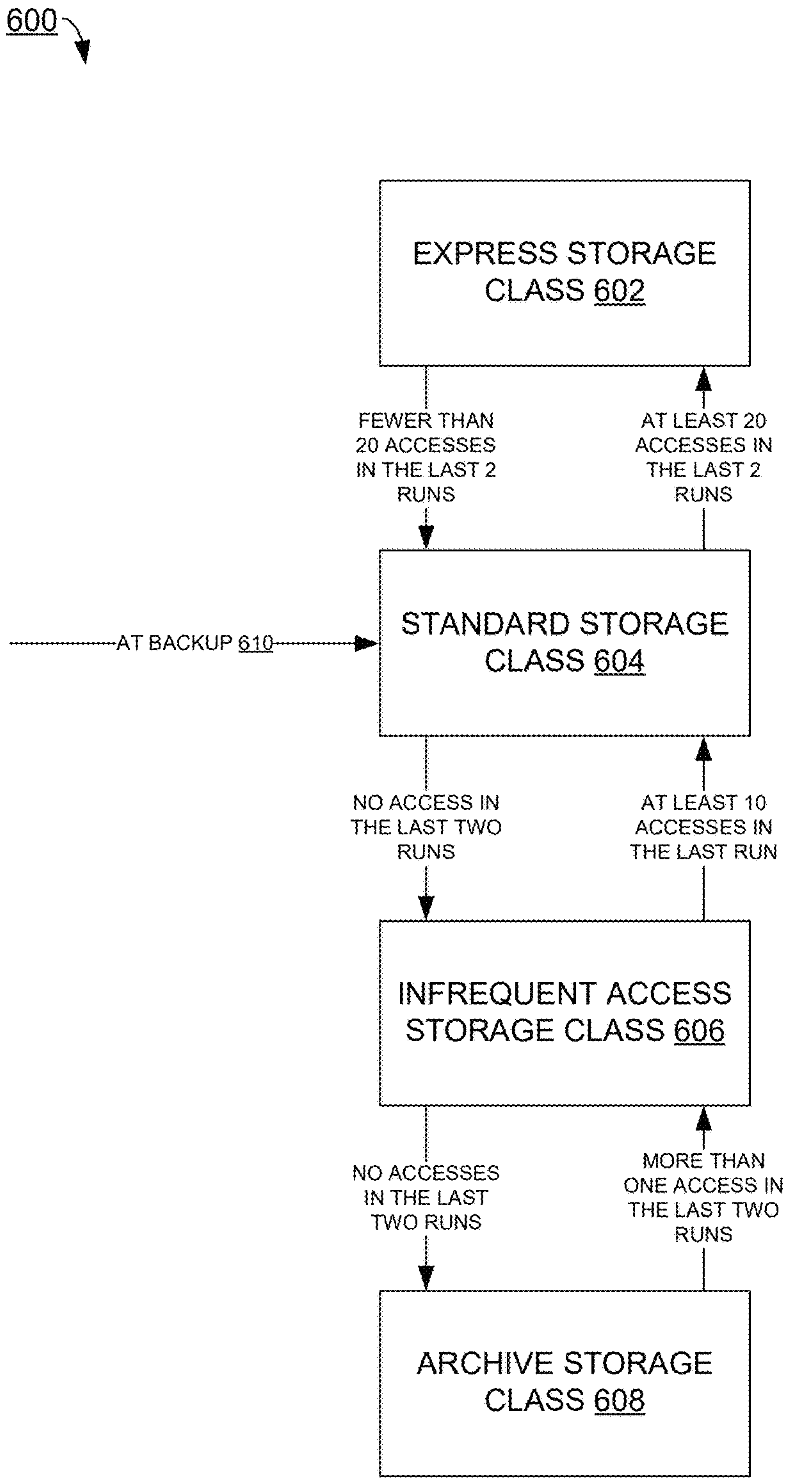
FIG. 6 illustrates an example state diagram that can facilitate dynamically assigning a storage class based on an access pattern on the source, in accordance with an embodiment of this disclosure.

FIG. 6 illustrates an example state diagram 600 that can facilitate dynamically assigning a storage class based on an access pattern on the source, in accordance with an embodiment of this disclosure. In some examples, part(s) of state diagram 600 can be used by part(s) of system architecture 100 of FIG. 1 to facilitate dynamically assigning a storage class based on an access pattern on the source.

State diagram 600 comprises express storage class 602, standard storage class 604, infrequent access storage class 606, archive storage class 608, and at backup 610.

Figure 7:
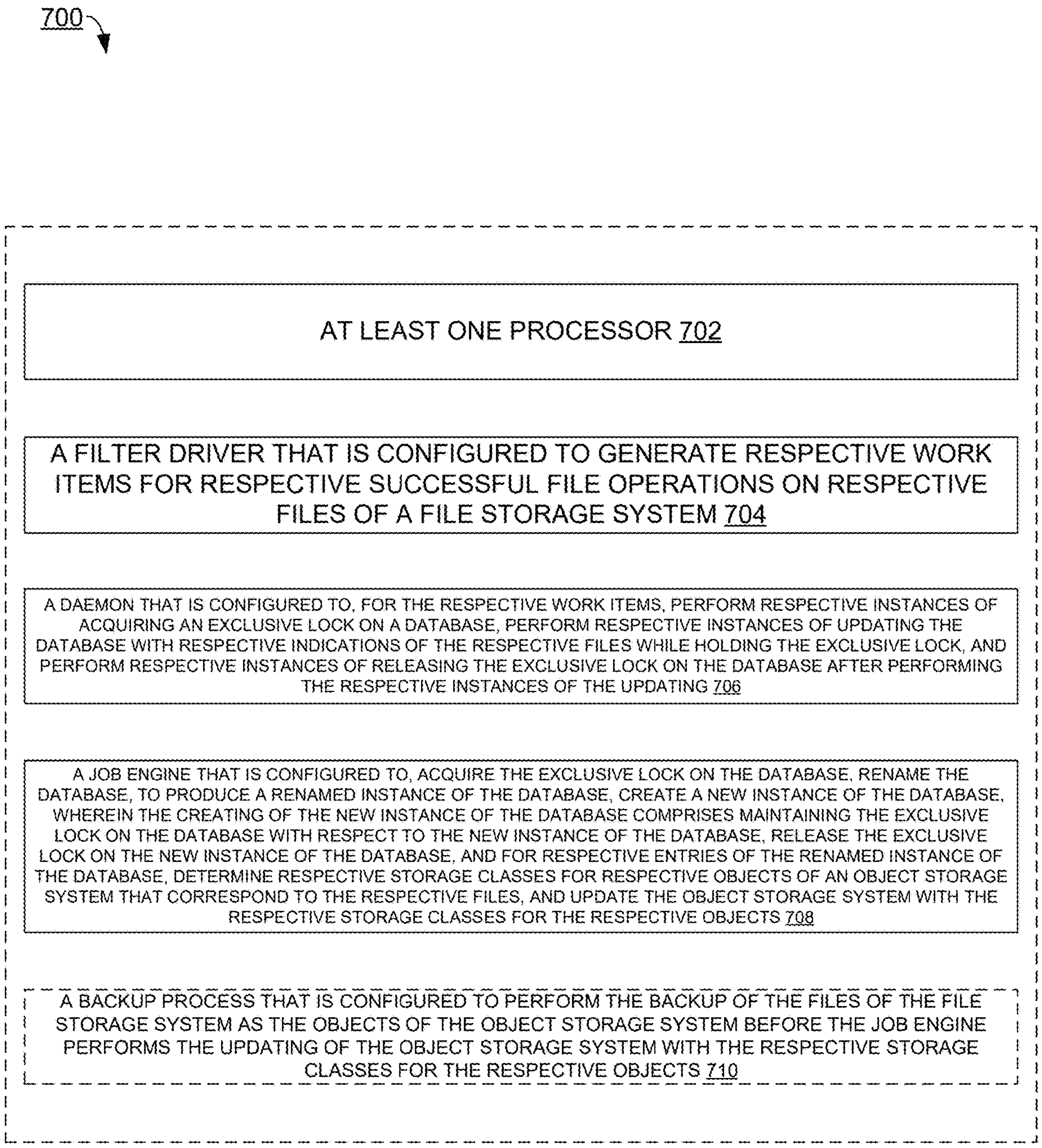
FIG. 7 illustrates another example system architecture that can facilitate dynamically assigning a storage class based on an access pattern on the source, in accordance with an embodiment of this disclosure.

FIG. 7 illustrates another example system architecture 700 that can facilitate dynamically assigning a storage class based on an access pattern on the source, in accordance with an embodiment of this disclosure. In some examples, part(s) of system architecture 700 can be used by part(s) of system architecture 100 of FIG. 1 to facilitate dynamically assigning a storage class based on an access pattern on the source.

System architecture 700 comprises at least one processor 702; a filter driver that is configured to generate respective work items for respective successful file operations on respective files of the system 704; a daemon that is configured to, for the respective work items, perform respective instances of acquiring an exclusive lock on a database, perform respective instances of updating the database with respective indications of the respective files while holding the exclusive lock, and perform respective instances of releasing the exclusive lock on the database after performing the respective instances of the updating 706; and a job engine that is configured to, acquire the exclusive lock on the database, rename the database, to produce a renamed instance of the database, create a new instance of the database, wherein the creating of the new instance of the database comprises maintaining the exclusive lock on the database with respect to the new instance of the database, release the exclusive lock on the new instance of the database, and for respective entries of the renamed instance of the database, determine respective storage classes for respective objects of an object storage system that correspond to the respective files, and update the object storage system with the respective storage classes for the respective objects 708.

In some examples, the objects of the object storage system correspond to a backup of the files of the file storage system. In some examples, system architecture 700 comprises backup process that is configured to perform the backup of the files of the file storage system as the objects of the object storage system before the job engine performs the updating of the object storage system with the respective storage classes for the respective objects 710. That is, using the example of FIG. 1, files 112 on file storage system 102 can be backed up as objects 122 on object storage system 106.

In some examples, filter driver 704 is configured to intercept communications between an operating system of system architecture 700 and a file system driver for the file storage system, wherein the file system driver is configured to manage how data of a file system that comprises the data is stored on a storage device.

In some examples, daemon 706 is configured to operate as a background process of the system and independently of receiving direct user input data interaction.

In some examples, job engine 708 comprises a software component that is configured to manage and execute scheduled tasks.

In some examples, job engine 708 is configured to perform iterations of the renaming of the database, the creating of the new instance of the database, and the updating of the object storage system. In some examples, the iterations are performed according to a schedule. That is, job engine 708 can run on a schedule to process entries in the current access-DB and use those processed entries to update storage classes of an object-storage backup of the files.

Example Process Flows

Figure 8:
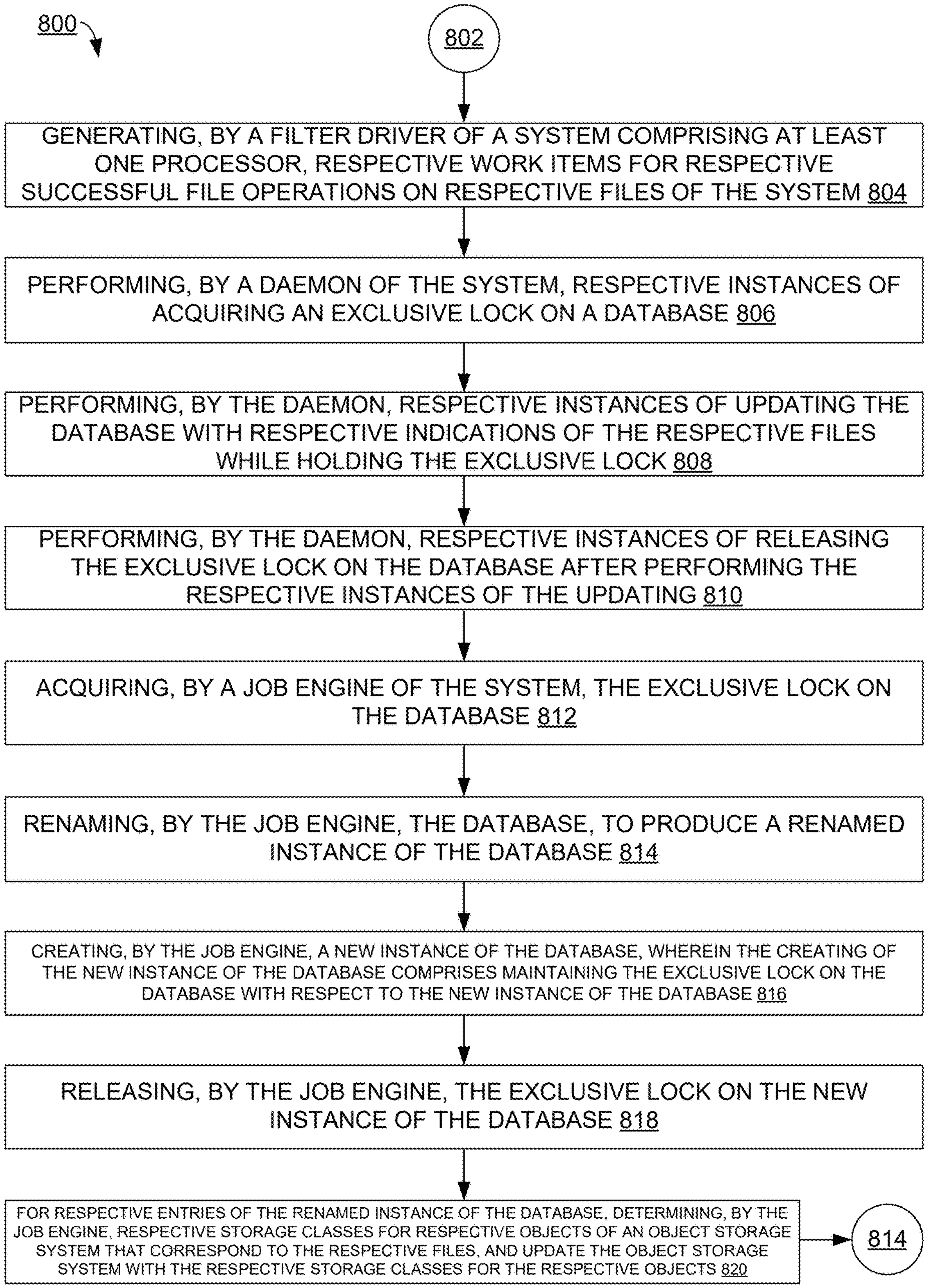
FIG. 8 illustrates another example process flow that can facilitate dynamically assigning a storage class based on an access pattern on the source, in accordance with an embodiment of this disclosure.

FIG. 8 illustrates another example process flow 800 that can facilitate dynamically assigning a storage class based on an access pattern on the source, in accordance with an embodiment of this disclosure. In some examples, one or more embodiments of process flow 800 can be implemented by dynamically assigning a storage class based on an access pattern on the source component 108 of FIG. 1, or computing environment 1000 of FIG. 10.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 200 of FIG. 2, and/or process flow 900 of FIG. 9.

Process flow 800 begins with 802, and moves to operation 804.

Operation 804 depicts generating, by a filter driver of a system comprising at least one processor, respective work items for respective successful file operations on respective files of the system.

After operation 804, process flow 800 moves to operation 806.

Operation 806 depicts performing, by a daemon of the system, respective instances of acquiring an exclusive lock on a database.

After operation 806, process flow 800 moves to operation 808.

Operation 808 depicts performing, by the daemon, respective instances of updating the database with respective indications of the respective files while holding the exclusive lock.

In some examples, the performing, by the daemon, the respective instances of updating the database with the respective indications of the respective files while holding the exclusive lock is based on determining that the respective files are identified in a backup-to-cloud policy. That is, the daemon can add files for which file operations were performed and that are part of a backup-to-cloud policy to access-DB.

In some examples, operation 808 comprises refraining, by the daemon, from updating the database with an indication of a file based on the file being omitted from being identified in the backup-to-cloud policy. This can include refraining from obtaining and releasing a lock. That is, if a file that was subject to a file operation is not part of a backup-to-cloud policy, then then daemon can skip adding it to access-DB.

In some examples, operation 808 comprises, generating, by the system, respective hashes of the respective files, wherein the respective indications of the respective files comprise the respective hashes. That is, a string of characters that represents the contents of a file, or its file path (but is different from each) can be made according to a hash function, and that can be stored in access-DB to identify the file.

After operation 808, process flow 800 moves to operation 810.

Operation 810 depicts performing, by the daemon, respective instances of releasing the exclusive lock on the database after performing the respective instances of the updating.

After operation 810, process flow 800 moves to operation 812.

Operation 812 depicts acquiring, by a job engine of the system, the exclusive lock on the database.

After operation 812, process flow 800 moves to operation 814.

Operation 814 depicts renaming, by the job engine, the database, to produce a renamed instance of the database.

After operation 814, process flow 800 moves to operation 816.

Operation 816 depicts creating, by the job engine, a new instance of the database, wherein the creating of the new instance of the database comprises maintaining the exclusive lock on the database with respect to the new instance of the database.

After operation 816, process flow 800 moves to operation 818.

Operation 818 depicts releasing, by the job engine, the exclusive lock on the new instance of the database.

After operation 818, process flow 800 moves to operation 820.

Operation 820 depicts, for respective entries of the renamed instance of the database, determining, by the job engine, respective storage classes for respective objects of an object storage system that correspond to the respective files, and update the object storage system with the respective storage classes for the respective objects.

In some examples, the updating of the object storage system with the respective storage classes for the respective objects comprises, sending, by the system, respective application programming interface calls for the respective objects, wherein the respective application programming interface calls indicate the updating. That is a separate API call can be made for each object storage class change.

In some examples, a file of the file corresponds to multiple objects of the objects. That is, one file can be backed up across multiple objects.

In some examples, there is a defined number of the respective storage classes. For instance, there can be four storage classes: express, standard, infrequent access, and archive.

After operation 820, process flow 800 moves to 822.

Figure 9:
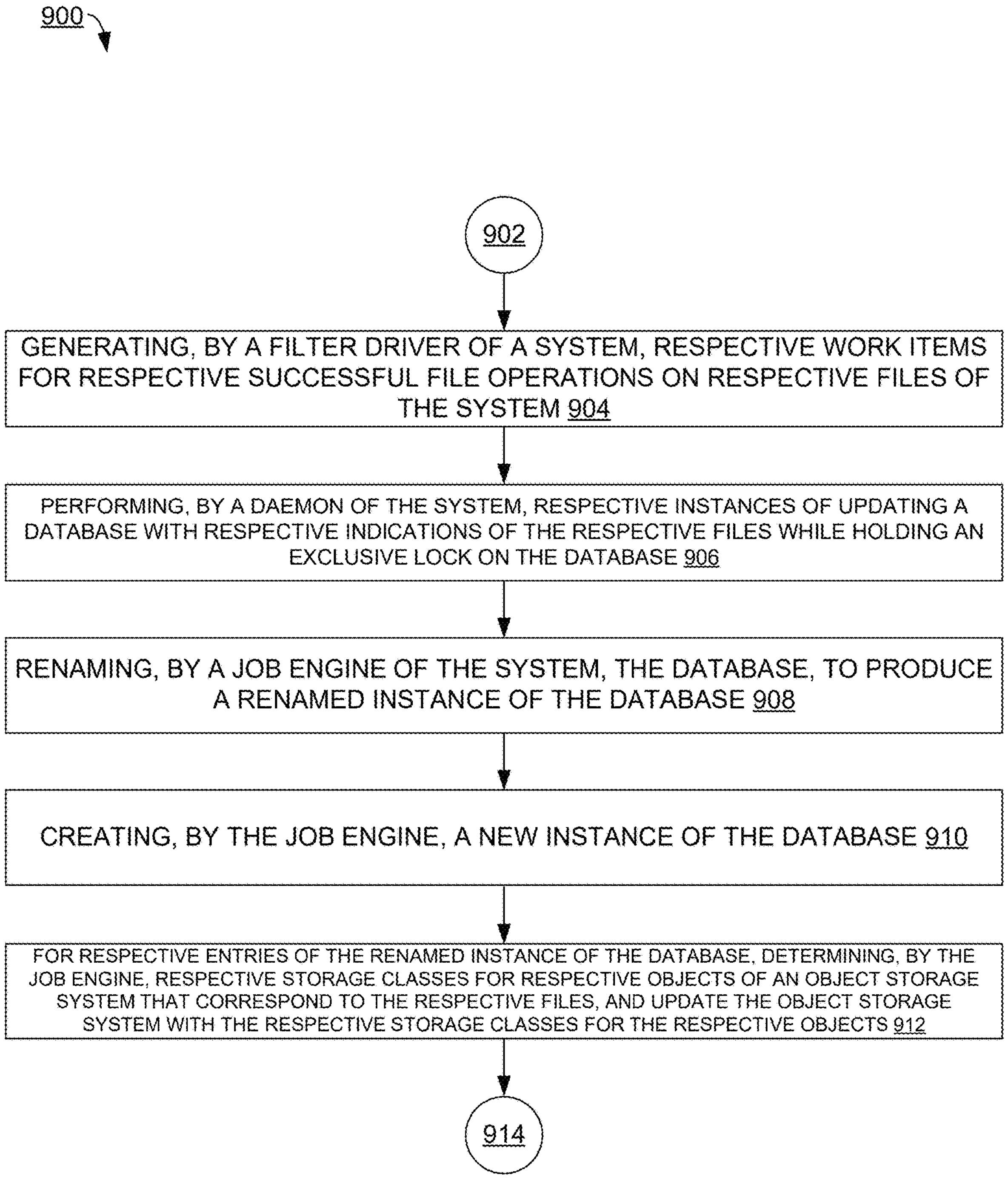
FIG. 9 illustrates another example process flow that can facilitate dynamically assigning a storage class based on an access pattern on the source, in accordance with an embodiment of this disclosure.

FIG. 9 illustrates another example process flow 900 that can facilitate dynamically assigning a storage class based on an access pattern on the source, in accordance with an embodiment of this disclosure. In some examples, one or more embodiments of process flow 900 can be implemented by dynamically assigning a storage class based on an access pattern on the source component 108 of FIG. 1, or computing environment 1000 of FIG. 10.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 200 of FIG. 2, and/or process flow 800 of FIG. 8.

Process flow 900 begins with 902, and moves to operation 904.

Operation 904 depicts generating, by a filter driver of the system, respective work items for respective successful file operations on respective files of the system.

After operation 904, process flow 900 moves to operation 906.

Operation 906 depicts performing, by a daemon of the system, respective instances of updating a database with respective indications of the respective files while holding an exclusive lock on the database.

In some examples, the performing of the respective instances of updating the database with respective indications of the respective files while holding the exclusive lock on the database comprises storing the respective indications of the respective files with respective times at which the respective successful file operations occurred. That is, pairs of files and times at which operations on those files occurred can be stored.

After operation 906, process flow 900 moves to operation 908.

Operation 908 depicts renaming, by a job engine of the system, the database, to produce a renamed instance of the database.

After operation 908, process flow 900 moves to operation 910.

Operation 910 depicts creating, by the job engine, a new instance of the database.

After operation 910, process flow 900 moves to operation 912.

Operation 912 depicts, for respective entries of the renamed instance of the database, determining, by the job engine, respective storage classes for respective objects of an object storage system that correspond to the respective files, and update the object storage system with the respective storage classes for the respective objects.

In some examples, operation 912 comprises determining the respective storage classes as being more performant storage classes than current storage classes of the objects based on the respective entries of the renamed instance of the database indicating that the respective files satisfy a frequent-access criterion.

In some examples, operation 912 comprises determining the respective storage classes as being less performant storage classes than current storage classes of the objects based on the respective entries of the renamed instance of the database indicating that the respective files satisfy an infrequent-access criterion. That is, more-frequently accessed files can have their objects stored in higher-performant storage classes, and less-frequently accessed files can have their objects stored in lower-performant storage classes.

In some examples, the respective storage classes correspond to respective durability criterions associated with respective storage devices, respective availability criterions associated with the respective storage devices, respective access frequency criterions associated with the respective storage devices, or respective cost criterions associated with the respective storage devices. That is, storage classes can have different performance characteristics.

After operation 912, process flow 900 moves to 914, where process flow 900 ends.

Example Operating Environment

In order to provide additional context for various embodiments described herein, FIG. 10 and the following discussion are intended to provide a brief, general description of a suitable computing environment 1000 in which the various embodiments of the embodiment described herein can be implemented.

For example, parts of computing environment 1000 can be used to implement one or more embodiments of file storage system 102 and/or object storage system 106.

In some examples, computing environment 1000 can implement one or more embodiments of the process flows of FIGS. 2-5 and 7-9 to facilitate dynamically assigning a storage class based on an access pattern on the source.

While the embodiments have been described above in the general context of computer-executable instructions that can run on one or more computers, those skilled in the art will recognize that the embodiments can also be implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a nonvolatile storage such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can also be connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are examples, and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches, and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations," this could include the processor performing the operations directly and/or facilitating, directing, or cooperating with another device or component to perform the operations.

In the subject specification, terms such as "datastore," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:

at least one processor;

a filter driver that is configured to generate respective work items for respective successful file operations on respective files of the system;

a daemon that is configured to, for the respective work items, perform respective instances of acquiring an exclusive lock on a database, perform respective instances of updating the database with respective indications of the respective files while holding the exclusive lock, and perform respective instances of releasing the exclusive lock on the database after performing the respective instances of the updating; and a job engine that is configured to:

acquire the exclusive lock on the database, rename the database, to produce a renamed instance of the database, create a new instance of the database, wherein the creating of the new instance of the database comprises maintaining the exclusive lock on the database with respect to the new instance of the database, release the exclusive lock on the new instance of the database, and for respective entries of the renamed instance of the database, determine respective storage classes for respective objects of an object storage system that correspond to the respective files, and update the object storage system with the respective storage classes for the respective objects.

2. The system of claim 1, wherein the objects of the object storage system correspond to a backup of the files of the file storage system.

3. The system of claim 2, further comprising:

a backup process that is configured to perform the backup of the files of the file storage system as the objects of the object storage system before the job engine performs the updating of the object storage system with the respective storage classes for the respective objects.

4. The system of claim 1, wherein the filter driver is configured to intercept communications between an operating system of the system and a file system driver for the file storage system, wherein the file system driver is configured to manage how data of a file system that comprises the data is stored on a storage device.

5. The system of claim 1, wherein the daemon is configured to operate as a background process of the system and independently of receiving direct user input data interaction.

6. The system of claim 1, wherein the job engine comprises a software component that is configured to manage and execute scheduled tasks.

7. The system of claim 1, wherein the job engine is configured to perform iterations of the renaming of the database, the creating of the new instance of the database, and the updating of the object storage system.

8. The system of claim 7, wherein the iterations are performed according to a schedule.

9. A method, comprising:

generating, by a filter driver of a system comprising at least one processor, respective work items for respective successful file operations on respective files of the system;

performing, by a daemon of the system, respective instances of acquiring an exclusive lock on a database;

performing, by the daemon, respective instances of updating the database with respective indications of the respective files while holding the exclusive lock;

performing, by the daemon, respective instances of releasing the exclusive lock on the database after performing the respective instances of the updating;

acquiring, by a job engine of the system, the exclusive lock on the database;

renaming, by the job engine, the database, to produce a renamed instance of the database;

creating, by the job engine, a new instance of the database, wherein the creating of the new instance of the database comprises maintaining the exclusive lock on the database with respect to the new instance of the database;

releasing, by the job engine, the exclusive lock on the new instance of the database; and for respective entries of the renamed instance of the database, determining, by the job engine, respective storage classes for respective objects of an object storage system that correspond to the respective files, and update the object storage system with the respective storage classes for the respective objects.

10. The method of claim 9, wherein the performing, by the daemon, the respective instances of updating the database with the respective indications of the respective files while holding the exclusive lock is based on determining that the respective files are identified in a backup-to-cloud policy.

11. The method of claim 10, further comprising:

refraining, by the daemon, from updating the database with an indication of a file based on the file being omitted from being identified in the backup-to-cloud policy.

12. The method of claim 9, wherein the updating of the object storage system with the respective storage classes for the respective objects comprises:

sending, by the system, respective application programming interface calls for the respective objects, wherein the respective application programming interface calls indicate the updating.

13. The method of claim 9, wherein a file of the file corresponds to multiple objects of the objects.

14. The method of claim 9, further comprising:

generating, by the system, respective hashes of the respective files, wherein the respective indications of the respective files comprise the respective hashes.

15. The method of claim 9, wherein there is a defined number of the respective storage classes.

16. A non-transitory computer-readable medium comprising instructions that, in response to execution, cause a system comprising at least one processor to perform operations, comprising:

generating, by a filter driver of the system, respective work items for respective successful file operations on respective files of the system;

performing, by a daemon of the system, respective instances of updating a database with respective indications of the respective files while holding an exclusive lock on the database;

renaming, by a job engine of the system, the database, to produce a renamed instance of the database;

creating, by the job engine, a new instance of the database; and for respective entries of the renamed instance of the database, determining, by the job engine, respective storage classes for respective objects of an object storage system that correspond to the respective files, and update the object storage system with the respective storage classes for the respective objects.

17. The non-transitory computer-readable medium of claim 16, wherein the performing of the respective instances of updating the database with respective indications of the respective files while holding the exclusive lock on the database comprises storing the respective indications of the respective files with respective times at which the respective successful file operations occurred.

18. The non-transitory computer-readable medium of claim 16, wherein the operations further comprise:

determining the respective storage classes as being more performant storage classes than current storage classes of the objects based on the respective entries of the renamed instance of the database indicating that the respective files satisfy a frequent-access criterion.

19. The non-transitory computer-readable medium of claim 16, wherein the operations further comprise:

determining the respective storage classes as being less performant storage classes than current storage classes of the objects based on the respective entries of the renamed instance of the database indicating that the respective files satisfy an infrequent-access criterion.

20. The non-transitory computer-readable medium of claim 16, wherein the respective storage classes correspond to respective durability criterions associated with respective storage devices, respective availability criterions associated with the respective storage devices, respective access frequency criterions associated with the respective storage devices, or respective cost criterions associated with the respective storage devices.

* * * * *